(12) United States Patent
Stöppelmann

(10) Patent No.: US 10,882,975 B2
(45) Date of Patent: Jan. 5, 2021

(54) FLAMEPROOF, ALIPHATIC POLYKETONE MATERIALS, MOULDED ARTICLES PRODUCED THEREFROM AND ALSO METHOD FOR THE PRODUCTION THEREOF

(71) Applicant: EMS-PATENT AG, Domat/Ems (CH)

(72) Inventor: Georg Stöppelmann, Bonaduz (CH)

(73) Assignee: EMS-Patent AG, Domat/Ems (CH)

( * ) Notice: Subject to any disclaimer, the term of this patent is extended or adjusted under 35 U.S.C. 154(b) by 275 days.

(21) Appl. No.: 15/349,636

(22) Filed: Nov. 11, 2016

(65) Prior Publication Data

US 2017/0137608 A1    May 18, 2017

(30) Foreign Application Priority Data

Nov. 13, 2015  (EP) .................................... 15194576

(51) Int. Cl.
| | |
|---|---|
| *C08K 7/14* | (2006.01) |
| *C08G 67/00* | (2006.01) |
| *C08G 67/02* | (2006.01) |
| *C08K 5/524* | (2006.01) |
| *C08K 5/5313* | (2006.01) |
| *C08K 5/5317* | (2006.01) |
| *C08K 5/5393* | (2006.01) |
| *C08L 73/00* | (2006.01) |
| *C08K 5/13* | (2006.01) |

(52) U.S. Cl.
CPC ................ *C08K 7/14* (2013.01); *C08G 67/00* (2013.01); *C08G 67/02* (2013.01); *C08K 5/524* (2013.01); *C08K 5/5313* (2013.01); *C08K 5/5317* (2013.01); *C08K 5/5393* (2013.01); *C08L 73/00* (2013.01); *C08K 5/13* (2013.01)

(58) Field of Classification Search
CPC ... C08K 7/14; C08K 3/00; C08K 5/13; C08K 5/5313; C08K 5/5393; C08G 67/00; C08G 67/02; C08L 73/00
USPC ........................................................ 524/126
See application file for complete search history.

(56) References Cited

U.S. PATENT DOCUMENTS

| | | | |
|---|---|---|---|
| 4,843,144 A | 6/1989 | Van Broekhoven et al. | |
| 4,880,903 A | 11/1989 | Van Broekhoven et al. | |
| 4,960,807 A | 10/1990 | Smunty | |
| 5,028,652 A | 7/1991 | Smunty et al. | |
| 5,633,301 A | 5/1997 | Moy et al. | |
| 6,372,835 B1* | 4/2002 | Nosu ...................... | C08G 67/02 523/200 |
| 2005/0004292 A1* | 1/2005 | Harashina ................ | C08K 5/34 524/430 |
| 2007/0299171 A1 | 12/2007 | Couillens et al. | |

FOREIGN PATENT DOCUMENTS

| | | |
|---|---|---|
| CN | 1596288 A | 3/2005 |
| CN | 1902275 A | 1/2007 |
| CN | 102307947 A | 1/2012 |
| DE | 2626272 A1 | 12/1976 |
| DE | 19808938 A1 | 10/1998 |
| EP | 0 213 671 A1 | 3/1987 |
| EP | 0 257 663 A2 | 3/1988 |
| EP | 0 289 077 A2 | 11/1988 |
| EP | 0 310 166 A2 | 4/1989 |
| EP | 0 313 170 A1 | 4/1989 |
| EP | 0 322 959 A2 | 7/1989 |
| EP | 0 326 224 A2 | 8/1989 |
| EP | 0 489 517 A1 | 6/1992 |
| EP | 0 629 663 A1 | 12/1994 |
| EP | 0 714 938 A2 | 6/1997 |
| EP | 0 896 021 A1 | 2/1999 |
| EP | 0 921 159 A1 | 6/1999 |
| EP | 2 455 427 A1 | 5/2012 |
| GB | 2 322 861 A | 9/1998 |
| GB | 2 348 427 A | 10/2000 |
| JP | H01-135861 A | 5/1989 |
| JP | H11-181080 A | 7/1999 |
| JP | H11-236500 A | 8/1999 |
| JP | 2007-537321 A | 12/2007 |
| KR | 2012-0056090 A | 6/2012 |
| KR | 20120056090 A * | 6/2012 |
| WO | WO 93/001239 A1 | 1/1993 |
| WO | WO 97/014743 A1 | 4/1997 |

(Continued)

OTHER PUBLICATIONS

Shell Carilon® D26VM100 Polyketone Datasheet (www.matweb.conn/search/datasheet.aspx?MatGUID=22141a782a84423a94235a53a7c48f40). (Year: 2000).*
KR 20120056090 A—machine translation (Year: 2012).*
European Patent Office, European Search Report issued in European Application No. 15194576.3 (dated May 13, 2016) 14 pages.
Chinese National Intellectual Property Administration, First Office Action in Chinese Patent Application No. 201611042290.1 (dated Jun. 13, 2019).
Japan Patent Office, Notification of Reasons for Refusal in Japanese Patent No. 2016/209423 (dated Mar. 18, 2020).
Chinese National Intellectual Property Administration, Second Office Action including Supplementary Search Report in Chinese Patent Application No. 201611042290.1 (dated Dec. 30, 2019).

(Continued)

*Primary Examiner* — Ronald Grinsted

(74) *Attorney, Agent, or Firm* — Leydig, Voit & Mayer, Ltd.

(57) ABSTRACT

The present invention relates to polyketone molding compounds based on partially crystalline, aliphatic polyketones. In particular, it relates to halogen-free, flameproof molding compounds based on aliphatic polyketones which preferably comprise salts of phosphinic acids as flame retardant. The molding compounds fulfill the fire protection classification V0 according to UL94 and display good mechanical properties. These molding compounds are suitable for the production of in particular thin-walled molded articles for the electrical and electronics industry, such as for example housings, housing components or connectors.

16 Claims, No Drawings

(56) References Cited

FOREIGN PATENT DOCUMENTS

WO   WO 00/012608 A1   3/2000
WO   WO 2005/113661 A1   12/2005

OTHER PUBLICATIONS

Indonesian Patent Office, Substantive Examination Report in Indonesian Patent Application No. P-00201607550 (dated Oct. 22, 2019).
Chinese National Intellectual Property Administration, Third Office Action in Chinese Patent Application No. 201611042290.1 (dated Apr. 17, 2020).

* cited by examiner

FLAMEPROOF, ALIPHATIC POLYKETONE MATERIALS, MOULDED ARTICLES PRODUCED THEREFROM AND ALSO METHOD FOR THE PRODUCTION THEREOF

CROSS-REFERENCE TO A RELATED APPLICATION

This patent application claims the benefit of European Patent Application No. 15194576.3, filed Nov. 13, 2015, the disclosure of which is incorporated herein by reference in its entirety for all purposes.

The present invention relates to polyketone moulding compounds based on partially crystalline, aliphatic polyketones. In particular, it relates to halogen-free, flameproof moulding compounds based on aliphatic polyketones which preferably comprise salts of phosphinic acids as flame retardant. The moulding compounds fulfil the fire protection classification V0 according to UL94 and display good mechanical properties. These moulding compounds are suitable for the production of in particular thin-walled moulded articles for the electrical and electronics industry, such as for example housings, housing components or connectors.

STATE OF THE ART

Aliphatic polyketones have been known for many years and are distinguished by virtually constant mechanical properties between 10 and 100° C., very good hydrolysis resistance, high thermal dimensional stability, good resistance to wear and tear and a good barrier against fuels.

On the other hand, aliphatic polyketones, although they represent thermoplastic plastic materials with thoroughly good properties, have the disadvantage that they have relatively high melting points which are close to temperatures at which they are subject to chemical decomposition, in particular inter- and intramolecular aldol condensation reactions. This is problematic since the polyketone moulding compounds are, on the one hand, difficult to process in the melt when using normal processing technologies and, on the other hand, the properties of such moulding compounds can be affected detrimentally by the decomposition- and crosslinking reactions induced during processing.

In order to overcome these problems, various possible solutions are proposed in the literature. For example EP213671 and EP257663 describe aliphatic polyketones based on carbon monoxide, ethene and at least one further olefinically unsaturated monomer which have lower melting points than corresponding polyketone copolymers formed exclusively from carbon monoxide and ethene. The terpolymers shown by way of example can be processed at 20-30° C. lower temperatures at which the thermal decomposition and the crosslinking proceeds more slowly. Hence, these terpolymers have a larger processing window. DE2626272 pursues the same aim with a polymer-analogous conversion of the polyketones with primary monoamines, mono- or dithiols, the melting point of the original polyketone being able to be decreased by up to 80° C.

This solution approach mitigates the problem to a certain degree but does not resolve all of the problems during processing of polyketones in the melt. Thus, for further improvement in the polyketone moulding compounds, compositions are described which are based on the addition of other polymers, such as e.g. polyamide or polyolefin, the addition of plasticisers or the use of special additives. The use of further polymers has the disadvantage however that relatively large quantities thereof are required and hence in particular the thermal and mechanical properties are overall impaired. As a function of the added polymer, in addition undesired reactions with the polyketone can take place, as a result of which the properties of the formed moulding compounds are at a low level. On the other hand, plasticisers only represent a practicable solution approach if flexible moulding compounds are required.

The addition of aluminium-oxygen compounds is described in EP310166 and EP326224. For example, aluminium hydroxide is intended thus to ensure an improvement in the flow behaviour of polyketones because crosslinking at the processing temperature takes place delayed by the additive and proceeds also more slowly over the processing duration.

According to EP629663 or EP896021, the melt processing of polyketones can be further improved by the addition of 0.01 to 10% of pseudoboehmite. Pseudoboehmite thereby prevents the all too rapid increase in melt viscosity at processing temperatures of 20 K above the melting temperature of the polyketones.

According to JP11-181080, additives, such as aluminium- or magnesium oxide, can indeed improve the flow behaviour during the processing but do not prevent generation of volatile compounds due to decomposition of the polyketones. In order to reduce or prevent degassing, the treatment of the polyketones with ammonia or primary amines is proposed.

DE19808938 relates inter alia to the stabilisation of polycarbonate, polyester and polyketone against oxidative, thermal and light-induced decomposition, additional stabilisers being able to be added to the polymer, in addition to a benzofuran-2-one compound, inter alia phosphites and phosphinates.

If it is intended that the colour and the crystallinity of the polyketone moulding compounds are still preserved beyond the processing, in addition to the flowability, EP896021 recommends the use of a combination of aluminium hydroxide and polyol.

EP322959 describes fibre-reinforced polyketone moulding compounds, in particular moulding compounds reinforced with glass fibre, and also a method for obtaining this moulding compound from a polyketone solution. The aim is to increase the strength and the modulus of the moulding compound.

US2007/0299171A1 describes a flameproof combination for thermoplastics comprising at least 3 components, namely a phosphinate, a reaction product made of phosphoric acid and melamine and also a melamine condensation product, in particular melem. Exclusively polyamide PA66 is worked with as thermoplastic, the moulding compound comprising, in addition to 30% by weight of glass fibres, between 20 and 23% by weight of the flameproof combination. Polyketones, without more detailed description of the type, are mentioned only in a long list as a possible thermoplastic.

Flameproof, glass fibre-reinforced polyketone moulding compounds based on aliphatic polyketones are disclosed in WO97/14743. The fire retardant, magnesium hydroxide, is preferably contained in a concentration of 25-40% by weight in the moulding compound. The moulding compounds with 25% by weight of magnesium hydroxide and 15% by weight of glass fibres achieve the fire protection classification V0 with a sample thickness of 1.6 mm if no zinc-containing synergist is contained in the moulding compound.

PRESENTATION OF THE INVENTION

Accordingly, the object underlying the invention, inter alia, is to provide moulding compounds based on partially crystalline, aliphatic polyketones which are equipped with a halogen-free flame retardant, can be processed readily by means of injection moulding methods and have good mechanical properties. The moulding compounds should be V0, according to the fire protection classification according to UL94, with a sample thickness of 0.35 to 3.0 mm, in particular at 0.75 and 1.5 mm, and have sufficient flowability in order to be able to produce even thin-walled moulded parts with good quality. With respect to the mechanical properties, it is demanded that the breaking strength and the breaking elongation are at least at the level of the non-flameproof polyketone moulding compound with the same degree of reinforcement.

This object is achieved according to the invention by the polyamide moulding compounds the moulded article made of the polyketone moulding compound and the method for the production of a moulded article described herein, as well as advantageous embodiments thereof.

The invention hence relates to a flameproof polyketone moulding compound comprising or consisting of (A) 30-94% by weight of at least one partially crystalline, aliphatic polyketone with a melting temperature ($T_m$) in the range of 180° C.-280° C., measured by means of DSC according to ISO 11357-3 and at a heating rate of 20 K/min;
(B) 0-50% by weight of at least one filling- and reinforcing means;
(C) 6-15% by weight of at least one halogen-free flame retardant;
(D) 0-2.0% by weight of at least one organic phosphite and/or phosphonite;
(E) 0-10% by weight of at least one additive;

the percentages by weight of components (A) to (E) together producing 100%, the moulding compound preferably consisting exclusively of components (A) to (E).

The subsequent concentrations or concentration ranges, indicated here, relate respectively either to the sum of components A to E in the case where the moulding compound is formulated open ("comprising") or to the total moulding compound in the case where the moulding compound is formulated closed ("consisting of"). In the latter case, the moulding compound consists exclusively of components A to E.

According to a preferred embodiment, respectively independently of each other or in combination with each other, the content (A) of the at least one aliphatic polyketone is 35-83.85% by weight, preferably 40-76.7% by weight, particularly preferably 45-71.7% by weight, in particular 45-61.7% by weight,
(B) of the at least one filling- or reinforcing material is 10-50% by weight, preferably 15-45% by weight, further preferably 20-40% by weight, in particular 30-40% by weight,
(C) of the at least one halogen-free flame retardant is 7-12% by weight, preferably 8-11% by weight,
(D) of the at least one organic phosphite and/or phosphonite is 0.05 to 1.5% by weight, preferably of 0.1-1.0% by weight, and/or
(E) of the at least one additive is 0.1-5% by weight, preferably 0.2 to 3% by weight.

Component (A)

The matrix of the polyketone moulding compounds used according to the invention is based on at least one partially crystalline, aliphatic polyketone (component A) which has a melting point in the range of 180° C.-280° C., preferably of 200° C. to 240° C. and particularly preferably of 210° C. to 235° C., respectively measured by means of DSC according to ISO 11357-3 and at a heating rate of 20 K/min. Preferably, the proportion of component A is in the range of 35-83.85% by weight.

The aliphatic polyketones concern thermoplastic polymers with a linear alternating structure which essentially comprise one carbon monoxide molecule per molecule of an unsaturated hydrocarbon. Suitable unsaturated hydrocarbons are in particular olefins with up to 20 carbon atoms, preferably up to 10 carbon atoms, such as e.g. ethene and other α-olefins including propene, 1-butene, isobutene, 1-hexene, 1-octene and 1-dodecene. Furthermore, also olefinically unsaturated compounds with aryl substituents, such as e.g. styrene, p-methylstyrene, p-ethylstyrene and m-isopropylstyrene, are suitable as monomer.

Aliphatic polyketones which are preferred in the sense of the invention are alternating copolymers made of carbon monoxide and ethene or terpolymers made of carbon monoxide, ethene and a second ethylenically unsaturated hydrocarbon with at least 3 carbon atoms, in particular with an α-olefin, such as propene or 1-butene.

In particular, the at least one polyketone (A) is a terpolymer of the subsequent general formula

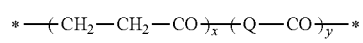

wherein Q is a divalent group, derived from olefinically unsaturated compounds with at least 3 carbon atoms, and the molar ratio y:x is less than or equal to 0.5, preferably less than 0.2, in particular less than or equal to 0.1, in particular of 0.01 to 0.1. Q is in particular the divalent unit —CH$_2$—CH(CH$_3$)— which is derived from propene.

For further preference, the at least one aliphatic polyketone is distinguished by at least one of the subsequently mentioned properties:

The polyketone a) is a partially crystalline polyketone, preferably with a melting temperature, measured by means of DSC according to ISO 11357-3 at a heating rate of 20 K/min, in the range of 180° C. to 280° C., in particular is of 200° C. to 240° C. or 210° C. to 235° C.,
b) has a melt viscosity (MVR, melt volume-flow rate), determined according to ISO 1133 at 240° C. with an overlay of 2.16 kg, in the range of 5-200 cm$^3$/10 min, in particular in the range 10-100 cm$^3$/10 min, very particularly preferably in the range of 20-80 cm$^3$/10 min,
c) has a relative viscosity, measured on solutions of 0.5 g polyketone, dissolved in 100 ml m-cresol at a temperature of 20° C. with a capillary viscometer, of 1.5 to 2.5, preferably of 1.6 to 2.2 and/or
d) has a number-average molar mass, determined by means of GPC in hexafluoroisopropanol relative to PMMA standards, in the range of 20,000 to 100,000 g/mol, in particular of 30,000 to 60,000 g/mol.

The aliphatic polyketone polymers are known per se. For example, U.S. Pat. No. 4,880,903 describes a linear alternating polyketone-terpolymer made of carbon monoxide, ethene and other olefinically unsaturated hydrocarbons, in particular propene. In the methods for the production of the aliphatic polyketones, generally the use of a catalyst composition made of a compound of a metal of group VIII is provided, selected from palladium, cobalt or nickel, the anion of a strong acid, not belonging to the halogen acids, and a bidentate phosphorus-, arsenic- or antimony ligand. In U.S. Pat. No. 4,843,144, a method for the production of linear alternating polyketone polymers made of carbon monoxide and at least one olefinically unsaturated hydrocarbon is described, in which a catalyst is used which comprises a palladium compound, the anion of an acid not belonging to the halogen acids with a pKa value below 6 and a bidentate phosphorus ligand. The polymerisation is implemented for example in methanol which assumes, at the same time, an initiator- and a chain transfer function so that ketones produced in this way have a typical end group pattern of keto- and ester groups. All of the polyketones disclosed in these patent specifications are suitable preferably also for the purposes of the present invention. The disclosure content in this respect of the previously mentioned US patents is consequently also included jointly in the present application.

Component (B)—Filling- and Reinforcing Materials

The polyketone moulding compounds according to the invention or the sum of components (A) to (E) comprise 0 to 50% by weight of filling- or reinforcing means, also termed particulate or fibrous filling materials. As component (B), the moulding compounds according to the invention can comprise 10-50% by weight, preferably between 15-45% by weight or 20-40% by weight, and very particularly preferably between 30 and 40% by weight, of fibrous or particulate filling materials or mixtures thereof.

In general, component B preferably relates to fibrous or particulate filling materials or mixtures thereof.

Fibrous filling materials are generally selected preferably from the group of glass fibres, carbon fibres (carbon fibres, graphite fibres), aramide fibres and whiskers.

The filling materials are preferably present in the form of endless strands or in cut form, in particular in the form of short glass fibres (cut glass). Preferably, the filling materials are equipped with a size and/or an adhesive.

Preferably, glass fibres made of E-glass are used as filling materials of component (B).

In general, fibres of component (B) can have a circular cross-section or a non-circular cross-section, also mixtures of such systems being able to be used.

Preferably, in the case of round fibres, those with a diameter of 5 to 20 µm, preferably of 6 to 15 µm and particularly preferably of 7 to 12 µm, are used.

In the case of flat fibres, those which have a ratio of cross-sectional axes, which are perpendicular to each other, greater than or equal to 2, in particular in the range 2.8-4.5, are preferred, and the smaller cross-sectional axis thereof has a length of ≥4 µm.

As examples of fibrous fillers, also fibrous reinforcing means may be mentioned, such as glass fibres, carbon fibres, aramide fibres, potassium titanate whiskers, glass fibres being preferred. Incorporation of glass fibres in the moulding compounds can be effected either in the form of endless strands (rovings) or in cut form (short glass fibres). For improving the compatibility with the aliphatic polyketones, the glass fibres which are used can be equipped with a size and an adhesive.

The glass fibres thereby consist preferably of E-glass. However, all other types of glass fibre, such as e.g. A-, C-, D-, M-, S-, R-glass fibres, or any mixtures thereof or mixtures with E-glass fibres, can be used. The glass fibres can thereby be added as endless fibres or as cut glass fibres, the fibres being able to be equipped with a suitable sizing system and an adhesive or adhesive system, e.g. based on silane, aminosilane or epoxysilane. Preferably, cut glass, so-called short glass fibres made of E- or S-glass, are used. Polar sizes are preferred as are also used for polyesters or polyamides.

Suitable glass fibres are both glass fibres with a circular cross-section (round glass fibres) and glass fibres with a non-circular cross-section (flat glass fibres).

The round glass fibres have a diameter of 5 to 20 µm, preferably of 6 to 15 µm and particularly preferably of 7 to 12 µm.

Preferably, fibres, preferably glass fibres, with a non-circular cross-section (flat glass fibres), in particular oval, elliptical, cocoon-like (two or more round glass fibres are joined together longitudinally) or rectangular or almost rectangular glass fibres, can also be used in the moulding compounds according to the invention.

Glass fibres with a non-circular cross-section (flat glass fibres) preferably have a dimensioning of the main cross-sectional axis in the range of 10 to 35 µm, in particular in the range 18 to 32 µm and a length of the subsidiary cross-sectional axis in the range of 3 to 15 µm, in particular in the range of 4-10 µm.

These moulding compounds then display advantages with respect to rigidity and strength, in particular in the transverse direction, in the case of the moulded parts produced from the moulding compounds. The preferably used flat glass fibres (component (B)) are short glass fibres (cut glass) with a flat shape and a non-circular cross-sectional area, the ratio of the cross-sectional axes, which are perpendicular to each other, being greater than or equal to 2, and the smaller cross-sectional axis having a length of ≥4 In particular, a glass fibre which is as rectangular as possible in cross-section is preferred. The glass fibres are present in the form of cut glass with a length of 2 to 50 mm. As was already explained above, the flat glass fibres within component B are used preferably as cut glass. These glass fibres have diameters of the small cross-sectional axis of 4 to 10 µm and a diameter of the large cross-sectional axis of 8 to 30 µm, the ratio of cross-sectional axes, which are perpendicular to each other (ratio of main to subsidiary cross-sectional axis), being between 2 and 6, preferably between 2.5 and 5 and very particularly preferably at 2.8 to 4.5.

The glass fibres can be replaced partially or entirely by whiskers. There should be understood by whiskers, needle-shaped crystals, in particular monocrystals made of metals, oxides, borides, carbides, nitrides, polytitanate, carbon etc. with usually polygonal cross-section, e.g. potassium titanate-, aluminium oxide-, silicon carbide whiskers. In general whiskers have a diameter of 0.1 to 10 µm and a length in the mm to cm range. At the same time, they have a high tensile strength. Whiskers can be produced by deposition from the vapour phase on the solid body (VS mechanism) or from a three-phase system (VLS mechanism).

Particulate filling materials of component (B) are preferably on a mineral basis, particularly preferably are selected based on talc, mica, silicate, quartz, titanium dioxide, wollastonite, kaolin, amorphous silicic acids, magnesium carbonate, magnesium hydroxide, chalk, lime, feldspar, solid- or hollow glass balls or ground glass, glass flakes, permanently magnetic or magnetisable metal compounds and/or alloys, pigments, in particular barium sulphate, titanium dioxide, zinc oxide, zinc sulphide, iron oxide, copper chromite, or mixtures thereof. The filling materials can also be surface-treated.

Component (C)

The moulding compound according to the invention comprises furthermore 6-15% by weight, preferably 7-12% by weight and in particular 8-11% by weight, of an organic halogen-free flame retardant or a combination of different organic halogen-free flame retardants or such a flame retardant in combination with one or more synergists (component C). Preferably, the entire component (C) is halogen-free.

A further preferred embodiment is therefore characterised in that the proportion of component (C) is in the range of 7-12% by weight, preferably in the range of 8-11% by weight, and preferably component (C) being configured at least partially based on a phosphinic acid salt and/or diphosphinic acid salt.

The flame retardant in component (C) or component (C) in its entirety thereby comprises, according to a further preferred embodiment, 60-100%, preferably 70-98% by weight, in particular 80-96% by weight, of a phosphinic acid salt and/or diphosphinic acid salt (component C1) and also 0-40% by weight, preferably 2-30% by weight, in particular 4-20% by weight, of a synergist, in particular of a nitrogen-containing synergist and/or of a nitrogen and phosphorus-containing flame retardant (component C2).

Formulated in general, this preferred embodiment is characterised in that component (C) comprises the following components, preferably consists of the following components:
(C1) 60-100% by weight, preferably 70-98% by weight, in particular 80-96% by weight, of a phosphinic acid salt and/or diphosphinic acid salt;
(C2) 0-40% by weight, preferably 2-30% by weight, in particular 4-20% by weight, of a synergist, in particular of a nitrogen-containing synergist and/or of a nitrogen and phosphorus-containing flame retardant, preferably melamine or condensation products of melamine, as selected particularly preferably from the group: melem, melam, melon, conversion products of melamine with polyphosphoric acid, conversion products of condensation products of melamine with polyphosphoric acid or mixtures thereof.

The concentration data for components C1 and C2 relate respectively to component C in its entirety, i.e. do not relate to the sum A to E or the moulding compound.

Component (C2) preferably concerns melamine or condensation products of melamine, such as e.g. melem, melam, melon, or conversion products of melamine with polyphosphoric acid, conversion products of condensation products of melamine with polyphosphoric acid or mixtures thereof. In particular, melamine polyphosphate is preferred as component (C2). Such flame retardants are known from the state of the art. Reference is made in this respect to DE 103 46 3261, the disclosure content of this specification is included expressly herein, in this respect. In a further embodiment, component (C2) as synergist is selected preferably as an oxygen-, nitrogen- or sulphur-containing metal compound. Preferred metals thereby are aluminium, calcium, magnesium, barium, sodium, potassium and zinc. Suitable compounds are selected from the group of oxides, hydroxides, carbonates, silicates, borates, phosphates, stannates, alkoxides, carboxylates and also combinations or mixtures of these compounds, such as e.g. oxide-hydroxides or oxide-hydroxide-carbonates. Examples are magnesium oxide, calcium oxide, aluminium oxide, zinc oxide, barium carbonate, magnesium hydroxide, aluminium hydroxide, boehmite, pseudoboehmite, dihydrotalcite, hydrocalumite, calcium hydroxide, calcium hydroxylapatite, tin oxide hydrate, zinc hydroxide, zinc borate, zinc sulphide, zinc phosphate, sodium carbonate, calcium carbonate, calcium phosphate, magnesium carbonate, basic zinc silicate, zinc stannate. Also possible are systems, such as calcium stearate, zinc stearate, magnesium stearate, barium stearate, potassium palmitate, magnesium behenate. In the case where synergists are contained as component (C2), which are contained possibly also as filling- and reinforcing means (component (B)), these substances are then no longer contained as filling- and reinforcing materials.

According to a further preferred embodiment, component (C1) is a phosphinic acid salt of the general formula (I) and/or formula (II) and/or the polymers thereof:

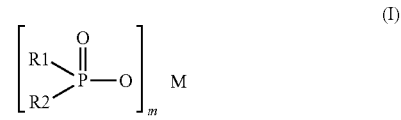

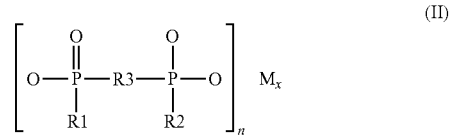

wherein
R1, R2 are the same or different and preferably are C1-C8 alkyl, linear or branched, saturated, unsaturated or partially unsaturated and/or aryl;
R3 is C1-C10 alkylene, linear or branched, saturated, unsaturated or partially unsaturated, C6-C10 arylene, alkylarylene or arylalkylene;
M is a metal ion from the $2^{nd}$ or $3^{rd}$ main or subsidiary group of the periodic table, preferably aluminium, barium, calcium, magnesium and/or zinc; and m=2 or 3; n=1 or 3; x=1 or 2. Aluminium and zinc are preferably used as metal ion M.

Suitable phosphinic acids for the production of the phosphinic acid salts according to the invention are for example dimethylphosphinic acid, ethylmethylphosphinic acid, diethylphosphinic acid, methyl-n-propylphosphinic acid, methane di(methylphosphinic acid), ethane-1,2-di(methylphosphinic acid), hexane-1,6-di(methylphosphinic acid), benzene-1,4-di(methylphosphinic acid), methylphenylphosphinic acid, diphenylphosphinic acid. The phosphinic acid salts can be produced for example by converting the phosphinic acids in aqueous solution with metal carbonates, metal hydroxides or metal oxides, essentially monomeric, according to the reaction conditions, possibly also polymeric phosphinic acid salts being produced.

Furthermore, it must hence be stressed in the case of the polyamide moulding compounds according to the invention or in the moulded articles produced therefrom that, in combination with the above-described excellent properties, also an excellent flame protection is achieved. The moulding compound is according to UL-classification V0 in the case of 0.35 to 3.0 mm thick test pieces (UL-94, test according to the standards of the Underwriters Laboratories (U.L.), cf. www.ulstandards.com).

Component (D)

The moulding compounds or the sum of components A to E comprise or consist of 0-2.0% by weight, preferably of 0.05 to 1.5% by weight, particularly preferably of 0.1 to 1.0% by weight, of at least one organic phosphite or phosphonite.

Preferred organic phosphites and phosphonites are triphenylphosphite, diphenylalkylphosphite, phenyldialkylphosphite, tris(nonylphenyl)phosphite, trilaurylphosphite, trioctadecylphosphite, di stearylphentaerythritoldiphosphite, tris (2,4-di-tert-butylphenyl)phosphite, diisodecylpentaerythritoldiphosphite, bis(2,4-di-tert-butylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris-(tert-butylphenyl))pentaerythritoldiphosphite, tristearylsorbitoltriphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocine, 6-fluoro-2,4,8,10-tetra-tert-butyl-12-methyldibenzo[d,g]-1,3,2-dioxaphosphocine, bis(2,4-di-tert-butyl-6-methylphenyl)methylphosphite and bis(2,4-di-tert-butyl-6-methylphenyl)ethylphosphite. In particular, tris[2-tert-butyl-4-thio(2'-methyl-4'-hydroxy-5'-tert-butyl)phenyl-5-methyl]phenylphosphite and tris(2,4-di-tert-butylphenyl)phosphite are preferred.

In particular, bis(2,6-di-t-butyl-4-methylphenyl)pentaerythritoldiphosphite, tris[2-tert-butyl-4-thio(2'-methyl-4'-hydroxy-5'-tert-butyl)phenyl-5- methyl]henylphosphite, tris(2,4-di-tert-butylphenyl)phosphite and tetrakis(2,4-di-t-butylphenyl)-4,4'-biphenylene diphosphonite (Sandostab P-EPQ" produced by Clariant) are preferred.

Component (E)

As component (E), the moulding compounds comprise 0-10% by weight, preferably 0.1-5% by weight and particularly preferably 0.2 to 3% by weight, of at least one additive or processing aid. The additives or processing aids thereby differ from components (A) to (D).

The moulding compounds can comprise stabilisers (heat- and light stabilisers, antioxidants), processing aids and further polymers, in particular polyolefins, acid- or anhydride-modified polyolefins, polyesters, polyamides, in particular aliphatic polyamides, impact modifiers and further additives.

The additives or processing aids are thereby different from the filling- and reinforcing means or the flame retardants, in particular from the synergists (C2) which can possibly be contained in the flame retardants.

Component (E) normally generally concerns additives and/or further polymers, for example selected from the following group: impact modifiers, adhesives, crystallisation accelerators or retarders, flow aids, lubricants, mould-release agents, plasticisers, stabilisers, processing aids, antistatic agents, pigments, colouring- and marking substances, nanoparticles in lamellar form, conductivity additives, such as carbon black, graphite powder or carbon nanofibrils, residues from polymerisation processes, such as catalysts, salts and derivatives thereof, and also regulators, such as e.g. monoacids or monoamines.

The proportion of component E is, according to a preferred embodiment, in the range of 0.1-10% by weight, preferably in the range of 0.2-3% by weight.

The invention relates furthermore also to the use of the above-described moulding compounds for the production of thermoplastically processible moulded articles and also moulded articles obtainable from the compositions according to the invention.

Examples of such moulded articles include: housings and functional parts for pumps, transmissions, valves and water meters, throttle valves, cylinders, pistons, headlight housings, reflectors, bend-light adjustment, toothed wheels, engine and transmission bearings, plug-in connections, connectors, profiles, foils or layers of multilayer foils, fibres, electronic components, in particular components for portable electronic devices, housings for electronic components, connectors, mobile telephone housings, components for LED housings, housings or housing parts for personal computers, in particular notebook housings, tools, composite materials, fluid-conducting pipes and containers, in particular in the automobile sphere, smooth and corrugated mono- or multilayer pipes, pipe sections, connection pieces, fittings for connecting hoses, corrugated pipes and media-conducting pipes, components of multilayer pipes (inner-, outer- or intermediate layer), individual layers in multilayer containers, hydraulic pipes, brake pipes, clutch pipes, coolant pipes, brake fluid containers etc. The moulded articles are producible by the methods of injection moulding, extrusion or blow-moulding.

DESCRIPTION OF PREFERRED EMBODIMENTS

Preferred embodiments of the invention are described subsequently with reference to embodiments, given by way of example, which serve only for explanation and should not be interpreted as restrictive.

Production of the Polyketone Moulding Compounds:

The raw materials of components (A), (C) and (D) are mixed in advance and metered gravimetrically into the feed of a twin-shaft extruder of the type ZSK25 (Werner and Pfleiderer). Component (B) is metered into the melt via a sidefeeder 4 housing units in front of the discharge. The process takes place at cylinder temperatures of 200-270° C. at a screw speed of rotation of 200 rpm and a throughput of 10 kg/h. The compound is discharged via a nozzle and granulated after cooling the strand. Subsequently drying takes place at 100° C. for 24 h in a vacuum.

Production of the Moulded Articles:

The production of the moulded articles is effected on an injection moulding machine, Arburg Allrounder 420C-1000-250, with a rising cylinder temperature profile in the range of 200-270° C. and injection pressures of 1,000-1,800 bar. The mould temperature is 80° C. The geometry of the moulded articles corresponds to the specifications of the corresponding testing standards.

The compositions of the moulding compounds and the properties of the moulded articles produced therefrom are compiled in table 1.

The Following Materials were Used:

PK-EP: average-viscous aliphatic polyketone made of carbon monoxide, ethylene and propylene with a melting point of 220° C., MFR (240° C., 2.16 kg) of 60 g/10 min, Hyosung Co. Ltd.

Exolit OP1230: aluminium-tris-diethylphosphinate, Clariant, CH

Magnifin H10 IV: high-purity magnesium hydroxide, Albemarle

Glass fibre: glass fibre with a round cross-section for polyamides, fibre length 4.5 mm, diameter 10 μm, Vetrotex Sandostab P-EPQ: tetrakis(2,4-di-t-butylphenyl)-4,4'-biphenylene diphosphonite (CAS: 38613-77-3), Clariant Stabiliser: Irganox 1010, sterically hindered phenolic antioxidant (BASF SE)

TABLE 1

Examples E1-E3 according to the invention and comparative examples CE1-CE4

|  |  | E1 | E2 | E3 | CE1 | CE2 | CE3 | CE4 |
|---|---|---|---|---|---|---|---|---|
| PK-EP | % by weight | 59.3 | 59.7 | 62.3 | 39.7 | 49.7 | 54.7 | 69.5 |
| Glass fibres | % by weight | 30.0 | 30.0 | 30.0 | 30.0 | 20.0 | 15.0 | 30.0 |
| Sandostab P-EPQ | % by weight | 0.2 |  | 0.2 |  |  |  |  |
| Exolit OP1230 | % by weight | 10.0 | 10.0 | 7.0 |  |  |  |  |
| Magnifin H10 IV | % by weight |  |  |  | 30.0 | 30.0 | 30.0 |  |
| Stabiliser | % by weight | 0.5 | 0.3 | 0.5 | 0.3 | 0.3 | 0.3 | 0.5 |
| Properties |  |  |  |  |  |  |  |  |
| Modulus of elasticity | MPa | 9,300 | 9,300 | 9,100 | 11,700 | 9,100 | 7,500 | 8,500 |
| Breaking strength | MPa | 126 | 123 | 132 | 130 | 114 | 107 | 112 |
| Breaking elongation | % | 5.0 | 5.1 | 5.2 | 2.6 | 2.8 | 3.4 | 2.6 |
| Impact 23° C. | kJ/m$^2$ | 85 | 78 | 86 | 54 | 52 | 56 | 52 |
| Impact −30° C. | kJ/m$^2$ | 76 | 70 | 75 | 30 | 32 | 33 | 40 |
| Notch impact 23° C. | kJ/m$^2$ | 13 | 13 | 14 | 9 | 8 | 8 | 12 |
| Notch impact −30° C. | kJ/m$^2$ | 10 | 10 | 11 | 6 | 6 | 5 | 9 |
| Fire test t |  |  |  |  |  |  |  |  |
| Thickness 0.75 mm | — | V0 | V0 | V0 | V0 | V0 | V0 | HB |
| Thickness 1.5 mm |  | V0 | V0 | V0 | V0 | V0 | V0 | HB |
| HDT A (1.80 MPa) | ° C. | 205 | 208 | 205 | 174 | 170 | 168 | 204 |
| HDT C (8.00 MPa) | ° C. | 145 | 148 | 143 | 122 | 115 | 108 | 162 |
| MVR (250° C./21.6 kg) | cm$^3$/10 min | 51 | 60 | 68 | 32 | 36 | 20 | 326 |

% by weight = percent by weight

The measurements were implemented according to the following standards and on the following test pieces in the dry state. This means that the test pieces are stored after the injection moulding for at least 48 h at room temperature in a dry environment, over silica gel, before they are supplied for the tests.

The thermal behaviour (melting point (TM), melting enthalpy (ΔHm), glass transition-temperature (Tg)) was determined by means of the ISO standard 11357 (11357-2 for the glass transition temperature, 11357-3 for the melting temperature and the melting enthalpy) on the granulate. The differential scanning calorimetry (DSC) was implemented at a heating rate of 20° C./min. The relative viscosity (ηrel) was determined according to DIN EN ISO 307 on solutions of 0.5 g polymer dissolved in 100 ml m-cresol at a temperature of 20° C. Granulate is used as sample.

Modulus of elasticity in tension, breaking strength and breaking elongation: modulus of elasticity in tension, breaking strength and breaking elongation were determined according to ISO 527 at a tensile speed of 1 mm/min (modulus of elasticity in tension) or at a tensile speed of 5 mm/min (breaking strength, breaking elongation) on the ISO test bar, standard ISO/CD 3167, type AI, 170×20/10×4 mm at temperature 23° C.

Impact strength and notch impact strength according to Charpy were measured according to ISO 179/keU or ISO 179/keA on the ISO test bar, standard ISO/CD 3167, type B1, 80×10×4 mm at a temperature of 23° C.

The MVR (melt volume-flow rate) is determined according to ISO 1133 by means of a capillary rheometer, the material (granulate) being melted in a heatable cylinder at a temperature of 250° C. and being pressed through a defined nozzle (capillary) at a pressure produced by the overlay load of 21.6 kg. The emerging volume of the polymer melt is determined as a function of time.

The thermal dimensional stability in the form of HDT A (1.80 MPa) and HDT C (8.00 MPa) was determined according to ISO 75-1 and ISO 75-2 on ISO impact bars of the dimension 80×10×4 mm (test pieces in flat-laid position).

The fire test was effected according to UL-94 ("Tests for Flammability of Plastic Materials for Parts in Devices and Applications" of the Underwriters Laboratories) on test pieces of the dimension 127×12.7×0.35, 127×12.7×0.75, 125×13.0×1.5 and 125×13.0×3.0 mm with normal conditioning (7 days, 70° C.).

Results:

Moulded articles according to the state of the art, equipped with magnesium hydroxide, have, with the same glass fibre content (CE1), significantly higher moduli of elasticity than the moulding compounds according to the invention since a higher concentration of this inorganic flame retardant is required in order reliably to reach the fire protection classification V0.

The breaking strength of the moulding compounds according to the invention is at least at the level of the moulding compounds of the state of the art, however outmatch these when compared with moulding compounds with similar rigidity.

Breaking elongation and also impact and notch impact, both at room temperature and at low temperatures, are significantly above the comparative examples. Furthermore, the flame retardant according to the invention prevents an all too steep increase in melting viscosity (MVR) so that the moulding compounds according to the invention are still sufficiently flowable in order to be able to produce even thin-walled moulded parts without difficulty.

If necessary, it can also be possible that the polyketone moulding compounds are free of magnesium hydroxide.

The invention claimed is:

1. A flameproof polyketone moulding compound consisting of:
(A) 30-94% by weight of at least one partially crystalline, aliphatic polyketone with a melting temperature ($T_m$) in the range of 180° C.-280° C., measured by means of DSC according to ISO 11357-3 and at a heating rate of 20 K/min;
(B) greater than zero to 50% by weight of at least one filling- or reinforcing material;
(C) 6-15% by weight of at least one halogen-free flame retardant;
(D) 0-2.0% by weight of at least one organic phosphite and/or phosphonite; and (E) greater than zero to 10% by weight of at least one additive;

the percentages by weight of components (A) to (E) together producing 100%;

and wherein the polyketone moulding compound is free of magnesium hydroxide;

wherein the at least one halogen-free flame retardant (C) is selected from the group consisting of at least one phosphinic acid, at least one diphosphinic acid, a metal salt or an organic derivative thereof, and mixtures or combinations thereof, optionally in combination with a synergist; and wherein the at least one additive (E) is selected from the group consisting of stabilisers, antioxidants, processing aids, polymers different from aliphatic polyketones, acid- or anhydride-modified polyolefins, polyesters, polyamides, impact modifiers, adhesives, crystallisation accelerators or retarders, flow aids, lubricants, mould-release agents, plasticisers, radical interceptors, antistatic agents, pigments, colouring- and marking substances, nanoparticles in laminar form, layer silicates, conductivity additives, residues from polymerisation processes, oxygen-, nitrogen- or sulphur-containing metal compounds, regulators, and mixtures or combinations thereof.

2. The polyketone moulding compound according to claim 1, wherein, independently of each other or in combination with each other, the content
(A) of the at least one aliphatic polyketone is 35-83.85% by weight,
(B) of the at least one filling- or reinforcing material is 10-50% by weight,
(C) of the at least one halogen-free flame retardant is 7-12% by weight,
(D) of the at least one organic phosphite and/or phosphonite is 0.05 to 1.5% by weight, and/or
(E) of the at least one additive is 0.1-5% by weight.

3. The polyketone moulding compound according to claim 1, wherein the at least one polyketone (A) is a polymer of carbon monoxide and at least one olefinically unsaturated compound.

4. The polyketone moulding compound according to claim 1, wherein the at least one polyketone (A) is a terpolymer of the general formula

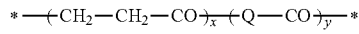

wherein Q is a divalent group, derived from olefinically unsaturated compounds with at least 3 carbon atoms, and the molar ratio y:x is less than or equal to 0.5.

5. The polyketone moulding compound according to claim 1, wherein the at least one aliphatic polyketone
a) is a partially crystalline polyketone,
b) has a melt viscosity (MVR, melt volume-flow rate), determined according to ISO 1133 at 240° C. with an overlayer of 2.16 kg, in the range of 5-200 cm³/10 min,
c) has a relative viscosity, measured on solutions of 0.5 g polyketone, dissolved in 100 ml m-cresol at a temperature of 20° C. with a capillary viscometer, of 1.5 to 2.5, and/or
d) has a number-average molar mass, determined by means of GPC in hexafluoroisopropanol relative to PMMA standards, in the range of 20,000 to 100,000 g/mol.

6. The polyketone moulding compound according to claim 1, wherein the at least one filling- or reinforcing material is selected from the group consisting of fibrous filling materials, particulate filling materials and mixtures thereof, which are optionally equipped with a size and/or an adhesive.

7. The polyketone moulding compound according to claim 6, wherein the fibrous filling materials
a) are selected from the group consisting of glass fibres, carbon fibres, metal fibres, aramide fibres, basalt fibres, whiskers, and mixtures or combinations thereof,
b) are present in the form of endless strands and/or in cut form, and/or
c) have a circular cross-section, a non-circular cross-section, or both.

8. The polyketone moulding compound according to claim 6, wherein the particulate filling materials are mineral particulate filling materials.

9. The polyketone moulding compound according to claim 1, wherein the at least one halogen-free flame retardant consists of
(C1) 60-100% by weight of at least one phosphinic acid, at least one diphosphinic acid, a metal salt and/or an organic derivative thereof and
(C2) 0-40% by weight of at least one synergist.

10. The polyketone moulding compound according to claim 9, wherein
(C1) the at least one phosphinic acid and the metal salts derived therefrom are of formula I or the at least one diphosphinic acid and the metal salts derived therefrom are of formula II

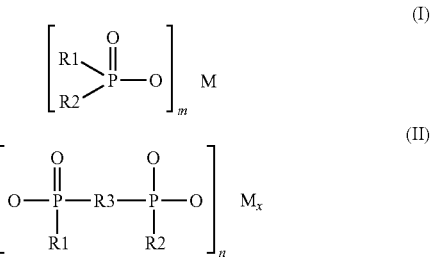

wherein
R1, R2 are the same or different and alkyl, linear or branched, saturated, unsaturated or partially unsaturated and/or aryl;
R3 is C1-C10 alkylene, linear or branched, saturated, unsaturated or partially unsaturated, C6-C10 arylene, alkylarylene or arylalkylene;
M is a hydrogen ion (proton) or a metal ion from group IIA, IIB, IIIA, or IIIB of the periodic table; m=2 or 3; n=1 or 3; and x=1 or 2;
and/or
(C2) the at least one synergist is selected from the group consisting of nitrogen and/or phosphorus-containing synergists, and oxygen-, nitrogen- or sulphur-containing metal compounds.

11. The polyketone moulding compound according to claim 2, wherein the at least one organic phosphite and/or phosphonite is selected from the group consisting of triphenylphosphite, diphenylalkylphosphite, phenyldialkylphosphite, tris(nonylphenyl)phosphite, trilaurylphosphite, trioctadecylphosphite, di stearylpentaerythritoldiphosphite, tris (2,4-di-tert-butylphenyl)phosphite, diisodecylpentaerythritoldiphosphite, bis(2,4-di-tert-butylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris-(tert-butylphenyl))pentaerythritoldiphosphite, tristearylsorbitoltriphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocine, 6-fluoro-2,4,8,10-tetra-tert-butyl-12-methyldibenzo[d,g]-1,3,2-dioxaphosphocine, bis(2,4-di-tert-butyl-6-methylphenyl)methylphosphite and bis(2,4-di-tert-butyl-6-methylphenyl)ethylphosphite.

12. The polyketone moulding compound according to claim 1, which is of a classification V0 with 0.35 to 3.0 mm thick test pieces according to UL94.

13. A moulded article produced from a polyketone moulding compound according to claim 1.

14. The moulded article according to claim 13, which is selected from the group consisting of housings, functional parts for pumps, transmissions, valves, water meters, throttle valves, cylinders, pistons, headlight housings, reflectors, bend-light adjustment, toothed wheels, engine and transmission bearings, plug-in connections, connectors, profiles, foils or layers of multilayer foils, fibres, electronic components, tools, composite materials, fluid-conducting pipes and containers, fittings for connecting hoses, corrugated pipes and media-conducting pipes, components of multilayer pipes, individual layers in multilayer containers, hydraulic pipes, brake pipes, clutch pipes, coolant pipes and brake fluid containers.

15. A method for the production of a moulded article according to claim 14, which comprises injection moulding, extrusion or blow-moulding.

16. The polyketone moulding compound according to claim 3, wherein the at least one olefinically unsaturated compound is selected from the group consisting of ethene and at least one further olefinically unsaturated compound with at least 3 carbon atoms, and mixtures or combinations thereof.

* * * * *